Sept. 23, 1958  C. A. LANE ET AL  2,853,630
CIRCUITS FOR CLAMPING VOLTAGE LEVELS IN GATING MATRICES
Filed June 8, 1954  2 Sheets-Sheet 1

INVENTORS.
CLAUDE A. LANE,
DONALD H. A. HAGEMAN,
BY
Henry Heyman
ATTORNEY.

Claude A. Lane,
Donald H. A. Hageman,
INVENTORS

United States Patent Office 2,853,630
Patented Sept. 23, 1958

2,853,630

CIRCUITS FOR CLAMPING VOLTAGE LEVELS IN GATING MATRICES

Claude A. Lane, Culver City, and Donald H. A. Hageman, Los Angeles, Calif., assignors to Hughes Aircraft Company, Culver City, Calif., a corporation of Delaware Application June 8, 1954, Serial No. 435,196

1 Claim. (Cl. 307—88.5)

This invention relates to circuits for clamping voltage levels in gating matrices, and more particularly to circuits for providing precise clamping of voltage levels at the output of a gating matrix by means of one or more rough clamping steps and a final precise clamping step.

In the computer art it has become the accepted practice to employ logical gating circuits utilizing the voltage-level method of gating, wherein input signals applied to, and output signals derived from, gating circuits are voltage-level signals. Such logical circuits are shown and described, for example, in U. S. Patent No. 2,644,887 entitled "Synchronizing Generator" by A. E. Wolfe, Jr., issued July 7, 1953, and also in copending U. S. patent application Serial No. 322,665 for "Serial Arithmetic Units for Binary-Coded Decimal Computers," Patent No. 2,-823,855 by Eldred C. Nelson, filed November 26, 1952, which is assigned to the same assignee as the present application.

In the voltage-level method of gating it is necessary to establish an upper voltage level and a lower voltage level; for example, corresponding respectively to binary 1 and binary 0. In the computer art these levels are roughly obtained from flip-flops employed for generating the signals. The output signal provided by a gating matrix may be utilized for triggering other flip-flops, hence the voltage difference between the two levels at the output of the matrix must be adequate for this purpose, a typical value being 15 volts. In the prior art it has been the practice to provide precise clamping of the voltage levels at each input of the gating matrix by clamping each flip-flop output circuit from which an input signal is obtained. Specific mechanizations of this type of clamping arrangement are shown, for example, in Fig. 6a of the patent to Wolfe and Fig. 4 of the copending application to Nelson.

There are several disadvantages associated with the clamping technique of the prior art. First, the normal plate voltage swing of the flip-flop is much greater than the difference between the clamping levels and the consequent heavy loading of the clamping diodes and power supplies has been a major cause of unreliable operation. The utilization of two or more diodes in parallel to prevent such overloading has not been entirely successful. A second disadvantage has been that, as clamping of the voltage levels has been provided only at the matrix input, voltage drops occurring within the gating matrix have resulted in inaccurate control of the levels at the matrix output. A third disadvantage of the prior art clamping technique has been that the clamping circuit inhibits the normal voltage swing at the plate of the flip-flop, thus affecting the internal operation of the flip-flop circuit and thereby limiting the internal stability and the available power output of the flip-flop.

The above and other disadvantages of the prior art are obviated by the present invention, which provides circuits for clamping the voltage levels by means of two or more successive clamping steps. The first clamping step provides a rough clamping action at each input to the gating matrix and the last step provides a precise clamping action at the matrix output. Overloading of the clamping circuits is precluded since precise clamping is attempted only after rough clamping has been achieved, and then only at the matrix output where the impedance of the matrix provides a buffering action for limiting the current in the clamping circuit. Inaccuracy in the clamping levels due to voltage drops within the matrix are also eliminated since precise clamping is provided at the matrix output, it being recognized that the exact point where precise clamping is required is the matrix output, rather than the matrix input circuits as indicated by the prior art.

Interference with the internal operation of flip-flops providing input signals to the gating matrix is also eliminated by the present invention. The first clamping circuit provides only a rough clamping action at the flip-flop output circuit. A buffering or isolating impedance is included for coupling the flip-flop plate to the rough clamping circuit, hence the flip-flop plate voltage swing may be permitted to be several times the difference between the clamping levels at the matrix output. As a result of these improvements the present invention makes it possible to greatly increase the number of gating circuits with which a single flip-flop may be loaded.

In one form the rough clamping circuit of the present invention includes a series resistor inserted in the signal line to permit clamping of the flip-flop output signal without clamping the flip-flop itself. First and second clamping diodes are coupled to the signal line to provide rough clamping of the output signal, the first clamping diode being connected to a source of clamping voltage corresponding to the upper voltage level and the second clamping diode being coupled to a source of clamping voltage corresponding to the lower voltage level.

In one specific form of the invention the rough clamping circuit is utilized in combination with a cathode follower for presenting a low impedance, high power signal source to the matrix input. Due to the inherent characteristic of a cathode follower the output voltage level is higher than the input level, hence the first clamping diode may be connected directly to the signal line and to the source of clamping voltage. The second clamping diode, however, is coupled to the clamping voltage through a resistor, in order to maintain the lower level of the signal voltage below the clamping level.

It is, therefore, an object of the present invention to provide improved circuits for clamping the voltage levels of a voltage-level signal produced by a gating matrix.

Another object of the invention is to provide clamping circuits for clamping the voltage levels in a gating matrix in two or more successive clamping steps, said clamping circuits including a rough clamp at each matrix input and a precise clamp at the matrix output.

Yet another object of the invention is to provide circuits for clamping voltage levels in gating matrices in two or more successive clamping steps, thereby limiting the current drain upon the clamping diodes and power supplies and thus insuring the reliability of the clamping circuits.

A further object of the invention is to eliminate inaccuracies in voltage levels at the output of a voltage-level gating matrix by providing precise clamping of the voltage levels at that point.

Still a further object of the invention is to provide circuits for clamping voltage levels in a gating matrix whereby each flip-flop circuit providing input signals to the matrix is isolated from the clamping action sufficiently to permit the full normal voltage swing of the flip-flop.

Yet a further object of the invention is to provide a rough clamping circuit for clamping the voltage levels of a flip-flop output signal without inhibiting the normal voltage swing of the flip-flop itself.

It is another object of the invention to provide a rough clamping circuit for isolating a signal source and providing rough clamping of the voltage levels of a voltage-level signal, at the same time limiting the current drain upon clamping diodes and power supplies.

The novel features which are believed to be characteristic of the invention, both as to its organization and method of operation, together with further objects and advantages thereof, will be better understood from the following description considered in connection with accompanying drawings in which several embodiments of the invention are illustrated by way of examples. It is to be expressly understood, however, that the drawings are for the purpose of illustration and description only, and are not intended as a definition of the limits of the invention.

Figure 1:
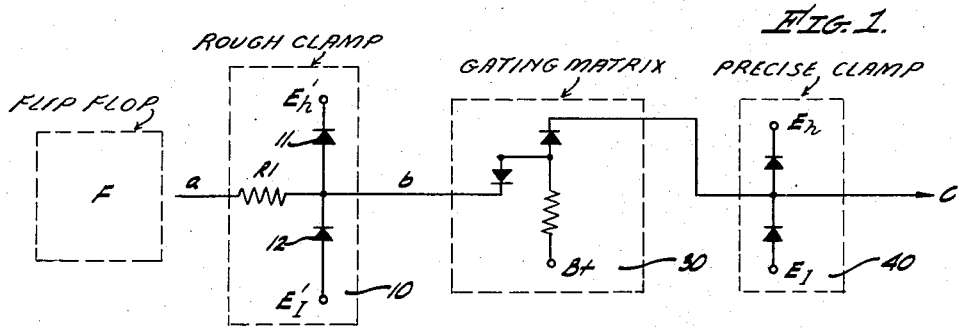
Fig. 1 shows a specific form of the invention wherein a flip-flop voltage-level signal is supplied through a rough clamping circuit to a diode gating matrix, the output of the gating matrix being clamped with a precise clamping circuit.

Reference is now made to Fig. 1 wherein there is shown a circuit for clamping a voltage-level output signal produced by a gating matrix 30 which is in turn controlled by large-amplitude voltage-level input signals supplied by a source F. The circuit includes a rough clamping circuit 10 for receiving the input signals, producing rough-clamped voltage-level signals of intermediate amplitude, and applying them to the matrix input. The circuit also includes a precise clamping circuit 40 connected to the matrix output for precisely clamping the output signals.

Figure 1A:
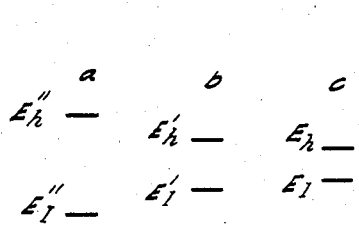
Fig. 1a illustrates upper and lower clamping levels at various points within the circuit of Fig. 1.

In the circuit of Fig. 1 the rough clamp and the precise clamp are utilized in combination to achieve the ultimate clamping action in successive steps. The manner in which this action is accomplished is illustrated in Fig. 1a, showing upper and lower clamping levels at points $a$, $b$, and $c$, which correspond to the output terminals of source F, rough clamp 10, and gating matrix 30, respectively. The symbol $E_h''$ indicates the upper voltage level supplied by the source, and the symbol $E_h$ represents the upper clamping level at the output of the matrix. Similarly, $E_l''$ denotes the lower voltage level supplied by the source and $E_l$ represents the lower clamping level at the matrix output.

It will be noted from Fig. 1a that the clamping levels at the output of rough clamp 10, indicated by symbols $E_h'$ and $E_l'$, represent a much smaller voltage swing than that which is initially provided by the source. Thus, the rough clamp provides clamping of the signal without inhibiting the normal action of the signal source.

It will also be noted from Fig. 1a that the voltage swing supplied to the matrix from the rough clamp is somewhat greater than that produced at the matrix output. Upper level $E_h'$ is slightly higher than $E_h$, and lower level $E_l'$ is slightly lower than $E_l$. Within matrix 30 each diode through which the current flows may produce a potential drop of a substantial fraction of a volt, hence the greater voltage swing at the input is provided to compensate for such voltage drops without affecting the precision of clamping at the output.

In the circuit of rough clamp 10 of Fig. 1 a series resistor R1 is connected to the signal source for providing isolation thereof. A first clamping diode 11 has its anode connected to the signal line and its cathode to a source of high level clamping voltage $E_h'$. A second clamping diode 12 has its cathode connected to the signal line and its anode to a source of clamping voltage $E_l'$.

Figure 3:
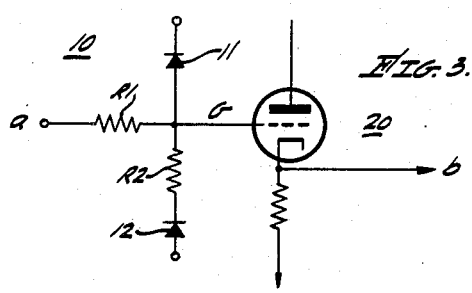
Fig. 3 shows a combination of rough clamping circuit and cathode follower, suitable for use in lieu of the rough clamping circuit of Fig. 1.
Figure 4:
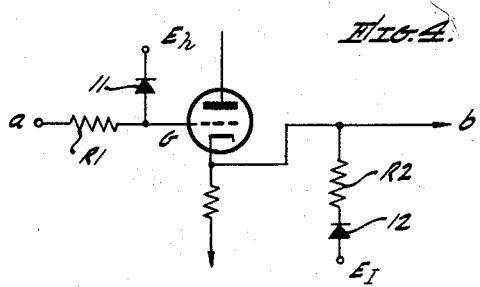
Fig. 4 illustrates another form of the circuit of Fig. 3.

Signal source F may be a flip-flop, the output signal being taken directly from the plate of one of the tubes, as shown in Fig. 6a of the patent to Wolfe, or from the junction point of two series plate load resistors, as shown in Fig. 4 of the Nelson application. Precise clamp 40 employs the type of conventional construction shown in the references. It will be noted that the diode symbol employed in Figs. 1, 2, 3, and 4 shows the arrow pointing in the direction of the current, which is the opposite convention from that employed in the Wolfe and Nelson references.

Figure 2:
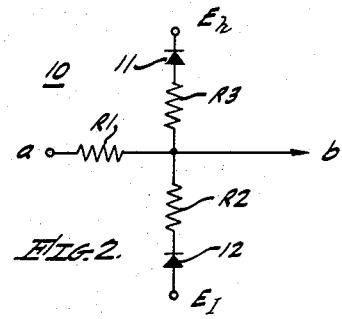
Fig. 2 shows another method of mechanizing the rough clamping circuit of Fig. 1.

Reference is now made to Fig. 2 wherein there is shown an equivalent form of the rough clamp of Fig. 1. Instead of utilizing clamping levels $E_h'$ and $E_l'$ representing a voltage swing of intermediate amplitude the circuit of Fig. 2 employs the basic clamping levels $E_h$ and $E_l$. A resistor R3 in series with diode 11, and a resistor R2 in series with diode 12, provide the rough clamping action so that the voltage swing at the output of the rough clamp will be of an intermediate value, greater than the difference between $E_h$ and $E_l$.

Reference is now made to Fig. 3 wherein there is shown, in combination, a rough clamping circuit 10 and a cathode follower 20, the combination being suitable for use in lieu of rough clamp 10 of Fig. 1. The cathode follower, which is included because of its high input impedance and low output impedance, operates effectively as a power step-up device for permitting a single flip-flop signal to be supplied to a large number of gating circuits.

Figure 3A:
Fig. 3a illustrates upper and lower clamping levels within the circuits of Figs. 3 and 4.

Clamping levels corresponding to the circuit of Fig. 3 are illustrated in Fig. 3a, where point $a$ corresponds to the input of the rough clamp, point $b$ corresponds to the output of the cathode follower, and point G represents the point of interconnection between the rough clamp and the cathode follower. It will be noted that at point G both upper and lower clamping levels are somewhat lower than their counterparts at point $b$. The reason for this is the inherent characteristic of a cathode follower that the cathode is always at a higher potential than the grid, the potential difference usually being of the order of one or two volts. Accordingly, the rough clamp of Fig. 3 provides rough clamping at the lower level, utilizing a resistor R2 and diode 12, in order to produce a lower voltage level intermediate between $E_l''$ and $E_l'$. At the upper level diode 11 provides precise clamping at $E_h$, since the cathode follower converts this to a higher level $E_h'$. Typical resistance values which may be used for R1 and R2 are 20K ohms and 10K ohms, respectively.

Reference is now made to Fig. 4 wherein there is shown an equivalent form of the circuit of Fig. 3. In Fig. 4 the rough clamping circuit is divided into two parts, clamping at the upper level being provided at the grid of the cathode follower and clamping at the lower level being provided at the cathode, or output. At point G the upper level is therefore the same as for Fig. 3, but the lower level is $E_l''$. This lower clamping level at point G is illustrated in Fig. 3a by means of a dotted line.

Figure 5:
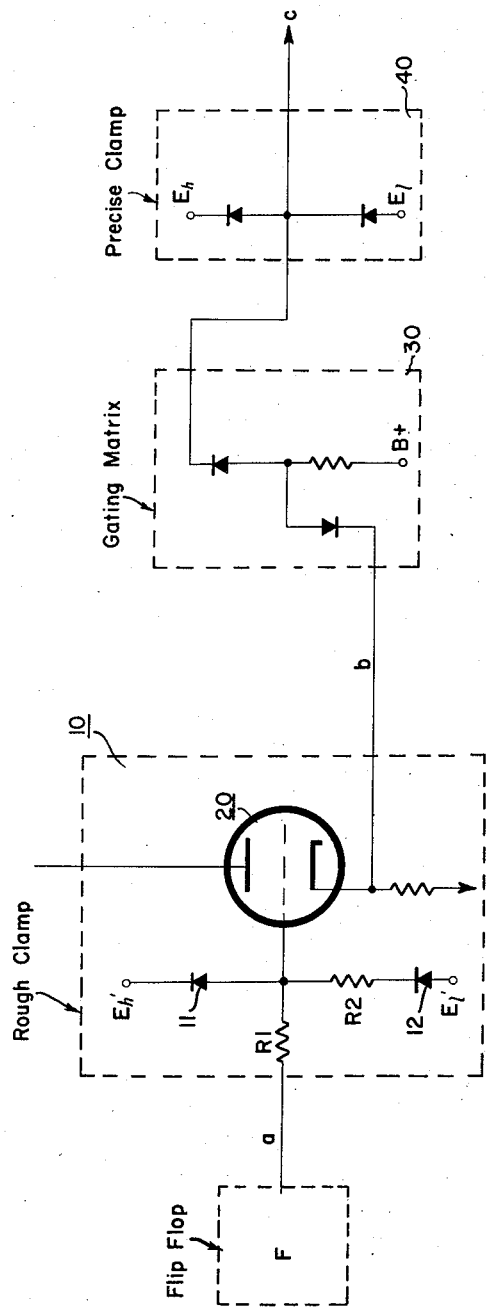
Fig. 5 illustrates the application of the circuit of Fig. 3 in the circuit arrangement of Fig. 1.

Fig. 5 combines the functional properties of the circuit of Fig. 3 in the circuit of Fig. 1. In this illustration the cathode follower 20 is included in the box designated Rough Clamp and may be considered as forming a part thereof although the voltage clamping action is essentially due to diodes 11 and 12 as in Fig. 1. The advantages resulting from the use of the cathode follower, as described in connection with Fig. 3, inhere in the combined circuit of Fig. 5, affording among other things a power gain after voltage clamping useful as input to a plurality of gating matrices.

Increased reliability of the clamping diodes provided by the present invention is of great importance. The prior art affords virtually no protection against overloading of the clamping diodes. The present invention by giving definite protection against large currents permits the smaller type of crystal diode to be utlized, and at the same time insures reliable and trouble-free operation.

The present invention has recognized that precise clamping is required, not at the input circuits of the gating matrix, but at the output circuit. The whole purpose of a gating matrix in a computer system is to form a new signal as a function of other signals. The new signal is all-important, hence the present invention provides precise clamping at the point where the new signal actually appears. This precise clamping may be achieved regardless of the size or complexity of the gating matrix, for according to the present invention the voltage swing applied at each matrix input circuit is adequate to compensate for these factors.

The advantages of the present invention may be more fully appreciated from a further consideration of the problem of flip-flop stability. A typical flip-flop circuit includes three matched pairs of resistors which may be described as the plate resistors, coupling resistors, and grid resistors, respectively. The voltage swing at the plate of the flip-flop is determined by the ratios of these resistors, as well as by the external load and clamping circuit. When a change of stable state is to be accomplished the voltage change occurring on one plate is applied to the opposite grid to assist in completing the change. Thus, the greater the voltage swing the more reliable is the triggering operation. Furthermore, the greater the voltage swing the more reliable is the stable state of the flip-flop. It is therefore apparent that the clamping method of the present invention, by increasing the available voltage swing of the flip-flop, has correspondingly increased its reliability and stability.

What is claimed as new is:

In a circuit responsive to voltage-level input signals, each having one of two possible voltage levels representing binary 0 or binary 1, for developing a precisely clamped voltage-level output signal having one of two predetermined voltage levels, the voltage difference between the two levels of said input signals being larger than that of the output signal, the combination comprising: a gating matrix having at least one input circuit and an output circuit; a cathode follower circuit including an electron tube having a control grid controlled by said input signals and having an anode and a cathode, said cathode follower circuit further including a load impedance connected in series with said cathode; circuit means connecting said load impedance to said input circuit of said gating matrix to apply voltage thereto; a rough voltage clamping circuit including a pair of back-biased diodes connected in opposite conductive senses to said control grid, and a precise voltage clamping circuit including a pair of back-biased diodes connected in opposite conductive senses to said output circuit of said gating matrix.

References Cited in the file of this patent

UNITED STATES PATENTS

| | | |
|---|---|---|
| 2,535,912 | Frank et al. | Dec. 26, 1950 |
| 2,672,283 | Havens | Mar. 16, 1954 |
| 2,683,807 | Paxson | July 13, 1954 |
| 2,686,299 | Eckert | Aug. 10, 1954 |
| 2,689,910 | Adelaar | Sept. 21, 1954 |
| 2,712,065 | Elbourn et al. | June 28, 1955 |
| 2,789,218 | Leonard | Apr. 16, 1957 |